UNITED STATES PATENT OFFICE.

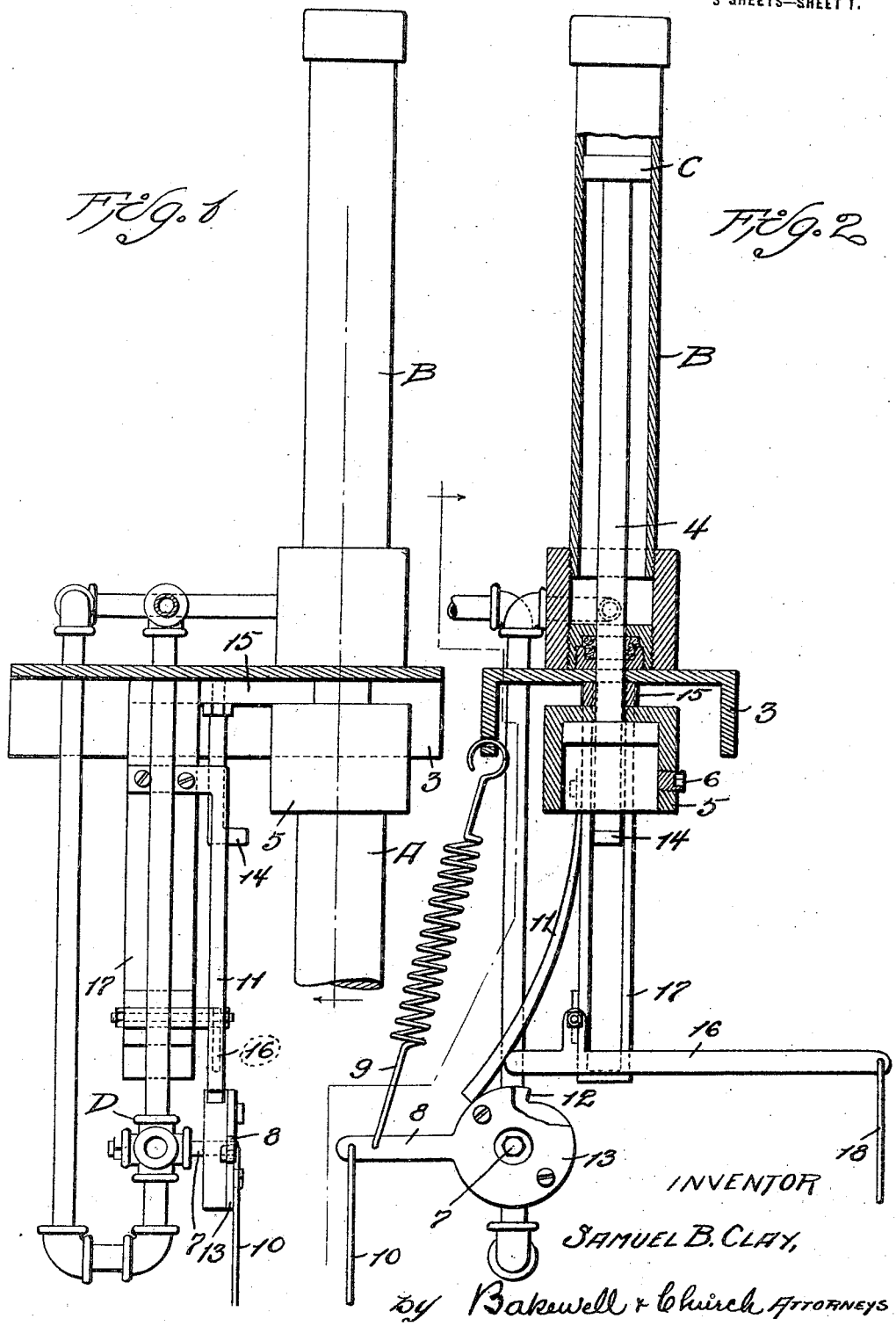

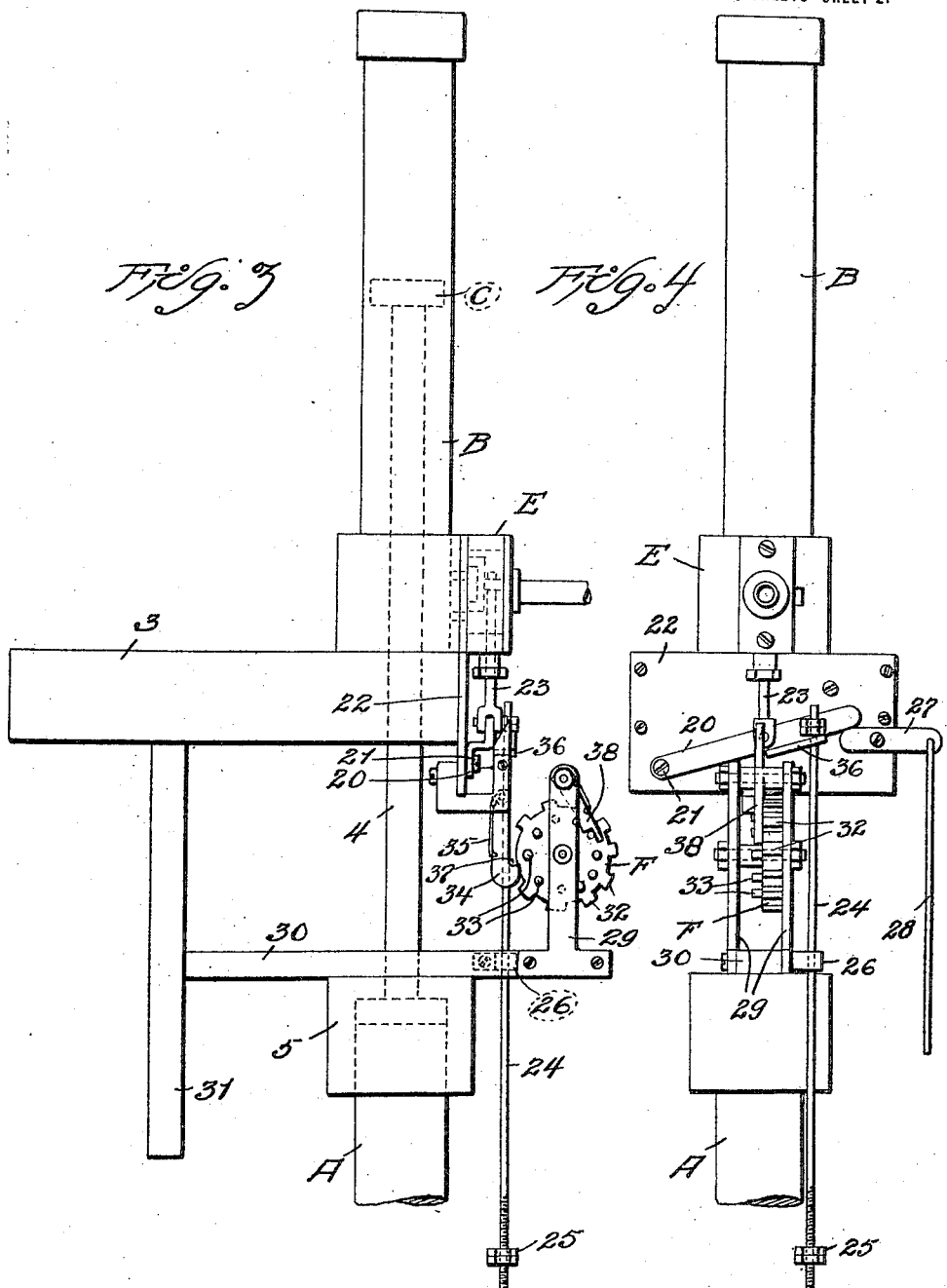

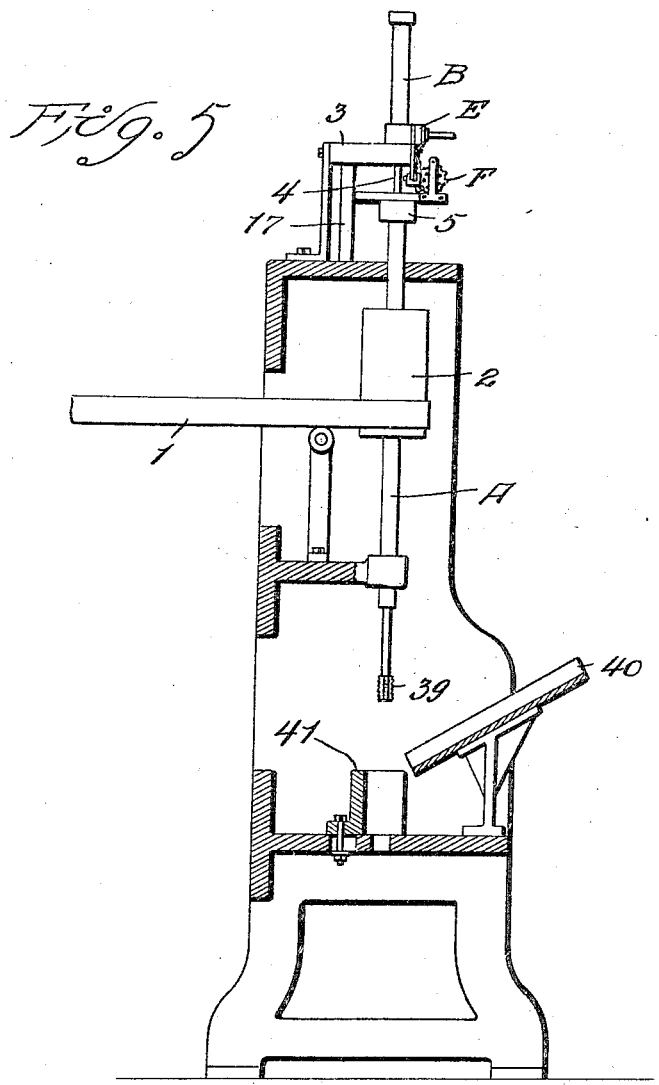

SAMUEL B. CLAY, OF ST. LOUIS, MISSOURI, ASSIGNOR OF ONE-HALF TO EDWARD R. FISH, OF WEBSTER GROVES, MISSOURI.

NUT-TAPPING MACHINE.

1,410,997.  Specification of Letters Patent.  Patented Mar. 28, 1922.

Application filed April 19, 1920. Serial No. 375,075.

*To all whom it may concern:*

Be it known that I, SAMUEL B. CLAY, a citizen of the United States, residing at St. Louis, Missouri, have invented a certain new and useful Improvement in Nut-Tapping Machines, of which the following is a full, clear, and exact description, such as will enable others skilled in the art to which it appertains to make and use the same.

This invention relates to nut tapping machines, and has for one of its objects to provide an attachment for nut tapping machines that will automatically raise the spindle of the machine which carries the tap at the completion of the operation of threading a nut blank.

Another object is to provide a nut tapping machine that will automatically tap or thread a number of nut blanks and then cease operating. Other objects and desirable features of my invention will be hereinafter pointed out.

Figure 1 of the drawings is a side elevational view of an attachment for nut tapping machines embodying my invention and so constructed that it will automatically raise the spindle of the machine at the completion of the threading operation.

Figure 2 is a front elevational view, partly in vertical section, of the mechanism shown in Figure 1.

Figure 3 is a side elevational view of a mechanism embodying my invention and so constructed that it will automatically tap or thread a number of nut blanks and then cease operating.

Figure 4 is a front elevational view of the mechanism shown in Figure 3; and

Figure 5 is a vertical sectional view of a nut tapping machine equipped with a mechanism of the kind illustrated in Figures 3 and 4.

Referring to Figures 1 and 2 of the drawings which illustrate one form of my invention, A designates the vertical spindle of an ordinary nut tapping machine that is provided with a tap (not shown) which cuts screw threads in a nut blank arranged on a suitable support beneath the tap on the spindle A when said spindle moves downwardly, the spindle being rotated by any suitable means, such, for example, as a belt 1 that passes over a pulley 2 on the spindle, as shown in Figure 5.

The ordinary nut tapping machine comprises a foot treadle which the operator in charge of the machine depresses so as to raise the spindle of the machine preparatory to positioning the nut blank, the operator releasing said treadle after the nut blank has been positioned so as to permit the spindle to move downwardly under its own weight to feed the tap through the nut blank. Such machines are tiresome to operate; they are comparatively slow in operation, due to the fact that the spindle is moved upwardly manually, and unless the operator uses care in releasing the foot treadle, injury to the operator's hands is liable to occur.

My invention, briefly stated, consists of a nut tapping machine equipped with a cylinder B provided with a piston C that is operatively connected with the spindle A of the machine and means for causing the piston C of said cylinder to move automatically in a direction to raise the spindle A of the machine upon the completion of the operation of tapping or threading a nut blank. In the form of my invention illustrated in Figures 1 and 2, a three-way valve D is provided for admitting an operating medium, which may consist of compressed air, to the lower end of the cylinder B, so as to raise the spindle A and for exhausting said operating medium from said cylinder so as to permit the spindle A to move downwardly by gravity. The cylinder B is arranged vertically or in an upright position on the supporting structure 3 and the rod 4 of the piston C is provided at its lower end with a swivel collar 5 that is securely connected to the spindle A of the machine by a set screw 6 or other suitable device, as shown in Figure 2, thus permitting the spindle to rotate relatively to the piston rod 4 which raises the spindle. The valve D that governs the admission and exhaust of the operating medium to and from the cylinder B is provided with a stem 7 equipped with a lever or arm 8, and a spring 9 is connected to said arm 8 so as to move the valve D into such a position that the operating medium will be supplied to the cylinder B, thus causing the piston C and spindle A to move upwardly. The valve D is moved in the opposite direction so as to cut off the supply of the operating medium to the cylinder by a link or operating rod 10 that is connected to the valve lever 8.

Figures 1 and 2 show the valve lever 8 raised or in the position it occupies when the valve D is open or adjusted so that direct communication is established between the source of supply of the operating medium and the cylinder B.

After the operator has positioned a nut blank in operative position beneath the tap on the spindle A he pulls the rod 10 downwardly so as to turn the valve D into such a position that the supply of the operating medium to the cylinder B is cut off and an exhaust port in said valve is opened through which the operating medium previously supplied to the cylinder B can escape, the valve being held in this position by a locking device preferably formed by a leaf spring 11 whose lower end engages a notch 12 formed in the periphery of a disk 13 secured to the valve lever 8. The spindle A and the piston in the cylinder B will now move downwardly under their own weight, and thus feed the tap on the spindle through the nut blank. At the completion of the threading or tapping operation a tripping device disengages the locking device 11 from the disk 13 on the valve lever, and thus permits the spring 9 to open the valve D, or, in other words, turn said valve into such a position that the operating medium will be admitted to the cylinder B. The spindle A will then move upwardly and remain in its elevated position until the valve D is again closed or turned into a position to exhaust the operating medium from the cylinder B. Various kinds of tripping devices may be used for automatically releasing the valve lever from the locking device 11, but I prefer to use a tripping device 14 carried by a part 15 that moves vertically with the spindle A and arranged so that the lower end of said device 14 will engage a lever 16 at the completion of the threading operation and cause said lever to disengage the locking device 11 from the notch in the periphery of the disk 13 on the valve lever. The part 15 that carries the tripping device 14 is guided by a vertically-disposed guideway 17, and the lever 16 that trips the locking device 11 is pivotally mounted on said guideway and is provided at its free end with a link or operating rod 18 which the operator can pull downwardly in the event that he desires to raise the spindle or reverse the direction of movement of the spindle prior to the completion of the nut threading operation.

The mechanism shown in Figures 3 and 4 embodies the same general characteristics of the mechanism shown in Figures 1 and 2, but it is so constructed that the spindle A of the machine will move upwardly and downwardly a number of times and then cease operating automatically, thus causing a number of nut blanks to be tapped automatically without requiring the operator to actuate a controlling device at each cycle of the machine. Said mechanism comprises a cylinder B equipped with a piston C whose rod 4 is provided with a swiveled collar 5 that is connected to the spindle A of the machine, but instead of using a three-way valve to control the admission and exhaust of the operating medium to and from the operating cylinder B, I use an ordinary D-shaped slide valve E that is moved automatically in one direction at the completion of the threading operation, so as to admit the operating medium to the cylinder B and is moved automatically in the opposite direction at the end of the upward stroke of the spindle A, so as to permit the operating medium to exhaust from the cylinder, thus permitting the spindle A to move downwardly by gravity. The actuating mechanism for the valve E comprises a lever 20 pivotally connected at 21 to a stationary supporting plate 22 and pivotally connected intermediate its ends to the stem 23 of the valve E, a depending rod 24 on the valve lever 20 provided with a stop 25 that is engaged by a lug 26 which moves vertically with the spindle A, and a toothed wheel F that moves vertically with the spindle and which is so arranged that it engages the valve lever 20 and moves same at the completion of the upward stroke of the spindle A. In addition to the automatic actuating mechanism for the valve E, a manually-operable means is provided for moving the valve lever 20 in a direction to cause the operating medium to exhaust from the cylinder, and thus effect the downward movement of the spindle A, said manually-operable means consisting of a pivotally mounted lever 27 on the stationary supporting plate 22 that is provided with an operating rod 28 and which is so arranged that the free end of said lever 27 will engage the free end of the valve lever 20 and move said valve lever when the operating rod 28 is pulled downwardly.

The toothed wheel F is rotatably mounted between a pair of uprights 29 carried by a horizontally-disposed bar or member 30 whose rear end portion is guided in a vertically-disposed guide 31 which projects downwardly from the supporting structure 3 that carries the cylinder B, said member 30 being connected to the piston rod 4 in such a manner that it will move vertically with said rod and with the spindle A. The wheel F is provided with a plurality of teeth 32, the number of which will vary according to the number of automatic operations it is desired to have the machine make. For example, if it is desired to have the machine make ten operations and then come to rest automatically, the wheel F will be provided with nine teeth and a blank space arranged between the first tooth and the last tooth on the periphery of the wheel. The function of the teeth 32 is to move the valve lever 20 upwardly at the completion of each upward stroke of the spindle A, so as to exhaust the operating medium from the cylinder B, and thus permit the spindle A to move downwardly by gravity, and in order that the machine will make a definite number of complete operations and then come to rest automatically, means is provided for turning the wheel E one step forwardly at each cycle of the spindle, so as to bring the blank space on said wheel into such a position with relation to the valve lever 20 that said lever will not be moved upwardly or in a direction to exhaust the operating medium from the cylinder at the completion of the last upward stroke of the spindle A. While various means can be used for turning the wheel E, I prefer to provide the wheel with laterally-projecting pins 33 arranged so that one of said pins will engage a pivotally-mounted dog 34 carried by a bracket on the stationary supporting plate 22 each time the spindle A moves downwardly, said dog causing the wheel F to rotate one step forwardly. The dog 34 is pivotally mounted on its supporting structure and is acted upon by a spring 35 shown in Figure 3 that normally holds the lower end of said dog in the path of vertical movement of one of the pins 33 on the wheel F. When the spindle A moves upwardly at the completion of the threading or tapping operation, the pin 33 on the wheel F which is then in vertical alignment with the dog 34 will strike against the curved lower end of said dog and swing said dog on its pivot sufficiently to permit the wheel F to move upwardly far enough to cause one of the teeth 32 on said wheel to engage a forwardly-projecting lug 36 on the valve lever 20 and move said valve lever upwardly. Thereafter, the spindle A moves downwardly, and during the downward movement of said spindle the pin 33 on the wheel F, which, on the prior upward stroke of said spindle engaged the dog 34, will drop into the notch 37 in the lower end portion of the dog, thereby momentarily holding the wheel F and causing it to rotate one step forwardly as the spindle A continues to move downwardly. Retrograde movement of the wheel F is prevented by means of a spring-pressed pawl 38 carried by the uprights 29 that co-operates with the laterally-projecting pins 33 on said wheel. When the wheel F reaches such a position that the blank space on the periphery of same is brought into operative relationship with the forwardly-projecting lug 36 on the valve lever 20, the machine will cease operating at the end of the upward stroke of the spindle A.

The nut blanks can be fed either manually or automatically into position to be engaged by the tap 39 on the spindle A. In Figure 5 of the drawings I have shown a machine equipped with an inclined trough or feeding device 40 down which the nut blanks are fed to a holder 41 arranged in alignment with the tap on the spindle A of the machine. To start the machine in operation the operator pulls downwardly on the rod 28 on the lever 27, thereby causing the valve lever 20 to be moved upwardly or in such a direction that the operating medium is exhausted from the cylinder B. The piston C in said cylinder and the spindle A to which said piston is connected move downwardly by gravity, thus causing the tap 39 to be fed through the nut blank. At the completion of the threading operation the lug 26 through which the depending rod 24 on the valve lever passes strikes against the adjustable stop 25 on the lower end of said rod 24, thereby causing the valve lever 20 to be moved downwardly so as to open the valve E and admit the operating medium to the cylinder B. The spindle A and the piston C will immediately move upwardly under the influence of the pressure in the cylinder B, and when the spindle A nears the end of its upward stroke one of the teeth 32 on the wheel F will strike against the forwardly-projecting lug 36 on the valve lever 20 and move said lever upwardly, thus automatically exhausting the operating medium from the cylinder and starting the spindle A on its downward stroke. On each downward stroke of the spindle A the wheel F is turned one step forwardly and when the blank space on the periphery of said wheel comes into operative relationship with the lug 36 on the valve lever the machine will cease operating.

Having thus described my invention, what I claim as new and desire to secure by Letters Patent, is:

1. A nut tapping machine provided with a reciprocating spindle adapted to have a tap connected to same, a cylinder provided with a piston that is operatively connected with said spindle, a valve for controlling the supply of an operating medium to said cylinder, and a means operated by the movement of the spindle for automatically changing the condition of said valve at the completion of the tapping operation so as to cause said spindle to restore the tap to its inoperative position.

2. In a machine of the general kind described, a reciprocating spindle, a cylinder provided with a piston operatively connected with said spindle, a valve for governing the admission and exhaust of an operating medium to and from said cylinder, automatic means for moving said valve when the spindle reaches the end of its stroke in one direction so as to restore said spindle to its starting position, and automatic means for moving said valve when the spindle reaches its starting position, for the purpose described.

3. A nut tapping machine provided with a reciprocating spindle, a cylinder provided with a piston for moving said spindle in one direction, a valve for governing the admission and exhaust of an operating medium to and from said cylinder so as to raise the spindle and thereafter permit the spindle to move downwardly by gravity, an automatic controlling mechanism for said valve constructed so that the spindle will make a number of complete cycles and then come to rest in its elevated position.

4. In a machine of the general character referred to, a reciprocating spindle, a cylinder provided with a piston operatively connected with said spindle, a valve for governing the admission and exhaust of an operating medium to and from said cylinder, and a controlling mechanism for said valve constructed in such a manner that the valve will open and close a definite number of times and then come to rest when the spindle is in an inoperative position.

5. In a machine of the general character described, a reciprocating spindle, a cylinder provided with a piston operatively connected with said spindle, a valve for controlling the admission and exhaust of an operating medium to and from said cylinder, an automatic operating mechanism for opening and closing said valve, and means operated by the movement of the spindle for causing said valve operating mechanism to open and close the valve a definite number of times and then come to rest with the valve in such a condition that the spindle will be maintained in an inoperative condition.

6. In a machine of the general character described, a reciprocating spindle, a cylinder provided with a piston operatively connected with said spindle, a valve for controlling the supply of an operating medium to said cylinder, means for automatically opening said valve when the spindle reaches the end of its stroke in one direction, and means for automatically closing the valve when the spindle reaches the end of its stroke in the opposite direction.

7. In a machine of the general character described, a reciprocating spindle, a cylinder provided with a piston operatively connected with said spindle, a valve for controlling the supply of an operating medium to said cylinder, means for automatically opening said valve when the spindle reaches the end of its stroke in one direction, means for automatically closing the valve when the spindle reaches the end of its stroke in the opposite direction, and means that co-operates with said valve operating mechanism for causing the spindle to make a number of complete cycles and then automatically come to rest.

8. In a machine of the general character described, a reciprocating spindle, a cylinder provided with a piston for actuating said spindle, a valve for controlling the supply of an operating medium to said cylinder, an automatic actuating mechanism for said valve arranged so that the spindle will make a number of complete cycles and then automatically come to rest, and a manually-operable means for actuating said valve so as to set the spindle in operation.

9. A machine of the general character described, comprising a reciprocating spindle, a cylinder provided with a piston operatively connected with said spindle, a valve for governing the admission and exhaust of an operating medium to and from said cylinder, means operated by the movement of the spindle in one direction for automatically opening said valve so as to admit the operating medium to the cylinder, means operated by the movement of the spindle in the opposite direction for automatically closing said valve so as to permit the operating medium to exhaust from the cylinder, and an independent manually-operable means for closing the valve.

10. In a machine of the general type referred to, a reciprocating spindle, a cylinder provided with a piston operatively connected with said spindle, a valve for controlling an operating medium used to actuate said piston, means for changing the position of said valve when the spindle reaches the end of its stroke in one direction, an adjustable device for restoring said valve when the spindle reaches the end of its stroke in the opposite direction, and means for automatically changing the condition of said adjustable device so that the spindle will make a number of complete cycles and then automatically come to rest.

11. A machine of the general character referred to, comprising a reciprocating spindle, a cylinder provided with a piston operatively connected with said spindle, an automatic mechanism for opening and closing said valve comprising an adjustable element that moves the valve in one direction at each complete cycle of the spindle, and means for moving said adjustable element one step forwardly at each cycle of the spindle during a certain definite number of strokes of the spindle.

12. In a machine of the general character described, a reciprocating spindle, a cylinder provided with a piston operatively connected with said cylinder, a controlling valve for the operating medium used to actuate the piston in said cylinder, a toothed element arranged to move with the spindle and provided with a plurality of teeth and a blank space, the teeth on said element being used to operate the controlling valve intermittently, and means for turning said element one step forwardly at each complete cycle of the spindle so as to bring the blank space on said element into an operative position after the spindle has made a number of complete cycles.

13. In a machine of the general character described, a reciprocating spindle, a cylinder provided with a piston operatively connected with said spindle, a controlling valve for the operating medium used to actuate said piston, a toothed wheel combined with said spindle in such a manner that one tooth on said wheel engages said controlling lever and moves it each time the spindle nears the end of its stroke in one direction, and means for turning said wheel each time the spindle moves in the opposite direction during a certain definite number of cycles of the spindle.

14. In a machine of the general character described, a reciprocating spindle, a cylinder provided with a piston operatively connected with said spindle, a controlling valve for the operating medium used to actuate the piston, a toothed wheel combined with the spindle and arranged so that one of the teeth thereon engages an arm on said controlling valve and moves it when the spindle reaches the end of its stroke in one direction, and a pivotally mounted dog that co-operates with pins on said wheel to automatically turn said wheel one step forwardly at each stroke of the spindle during a definite number of cycles of the spindle.

15. A nut tapping machine provided with a reciprocating spindle, a cylinder arranged above the spindle and provided with a piston that is operatively connected with the spindle, a controlling valve for the operating medium used to actuate the piston, a lever for moving said valve, a link depending from said lever and adapted to be moved during the downward stroke of the spindle so as to open said valve, a toothed wheel combined with said spindle for moving the lever to close said valve when the spindle reaches the end of its upward stroke, and a dog arranged in the path of travel of said wheel and co-operating with devices on said wheel to turn it intermittently during a definite number of strokes of the spindle.

SAMUEL B. CLAY.